May 1, 1962  G. A. KANE ET AL  3,031,848
PILOT RACK AND DIFFERENTIAL
Original Filed Oct. 22, 1959  7 Sheets-Sheet 3

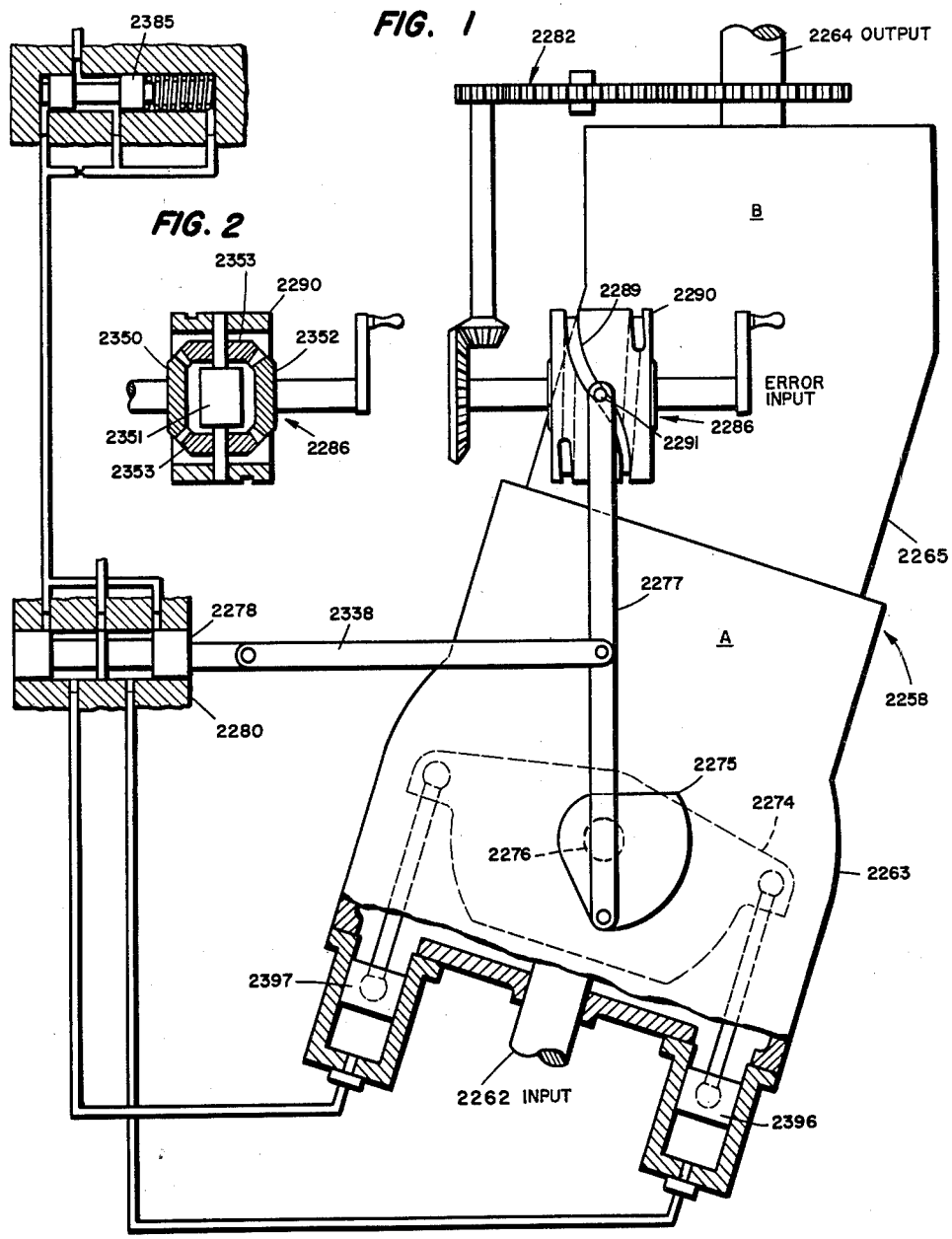

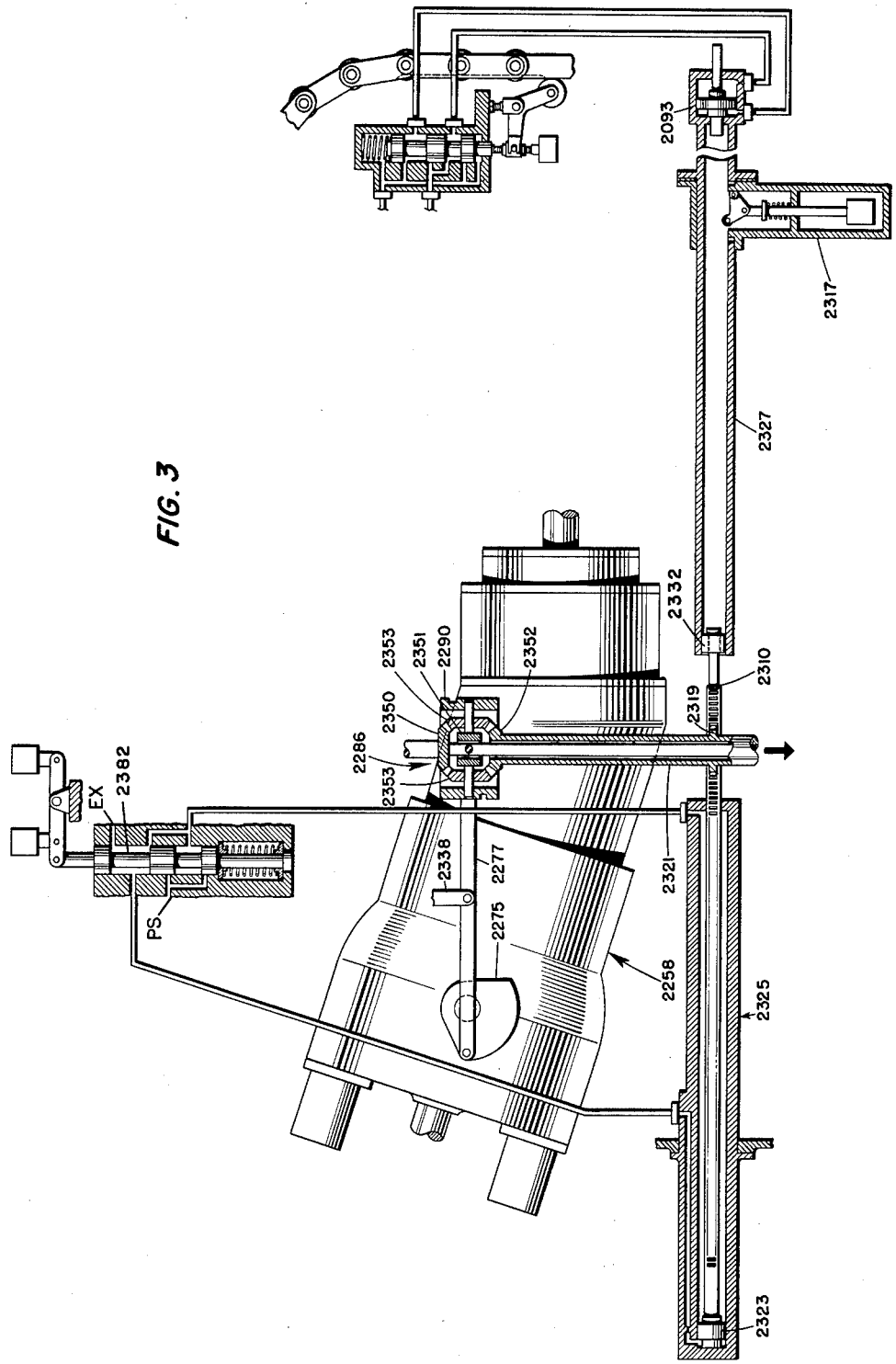

May 1, 1962 G. A. KANE ET AL 3,031,848
PILOT RACK AND DIFFERENTIAL
Original Filed Oct. 22, 1959 7 Sheets-Sheet 5

May 1, 1962 G. A. KANE ET AL 3,031,848
PILOT RACK AND DIFFERENTIAL
Original Filed Oct. 22, 1959 7 Sheets-Sheet 6
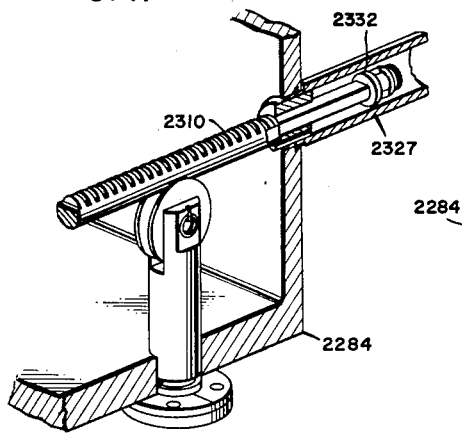
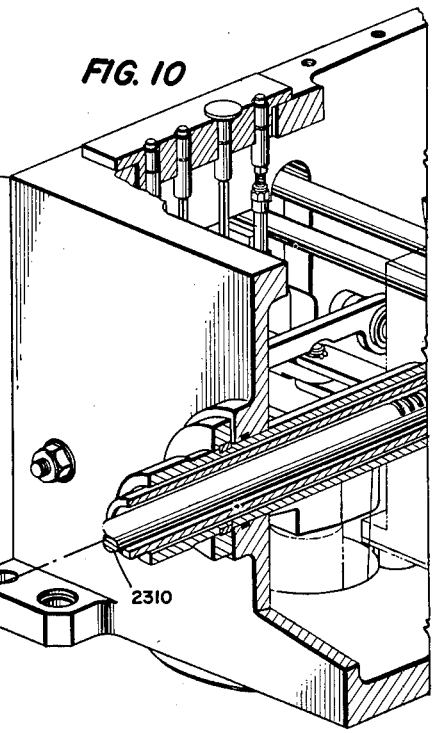
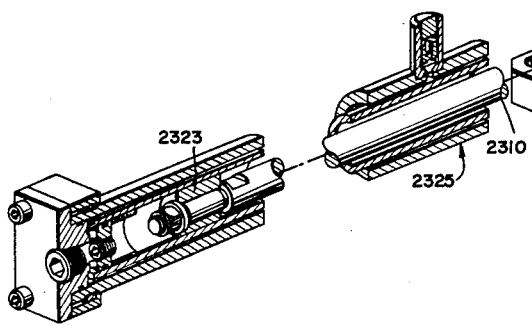

United States Patent Office 3,031,848
Patented May 1, 1962

3,031,848
PILOT RACK AND DIFFERENTIAL
Garold A. Kane, Minneapolis, and Richard C. Wilson, Champlin, Minn., assignors, by mesne assignments, to the United States of America as represented by the Secretary of the Navy
Original application Oct. 22, 1959, Ser. No. 848,163. Divided and this application Dec. 31, 1959, Ser. No. 863,365
4 Claims. (Cl. 60—53)

This invention relates generally to servo follow-up systems for hydraulic transmissions. More particularly, the invention pertains to a control signal injection mechanism which provides proportional control in a motor drive.

This application is a division of U.S. patent application, Serial Number 848,163, filed by Myron K. Bauer et al. on October 22, 1959, for "Guided Missile Launching System."

A pilot rack is a novel control device for a motor driven positioner, such as a loader conveyor for transporting missile weapons in a guided missile launching system, as described in the patent application referred to above. The pilot rack can be regarded as a miniature model of the conveyor or work area which can be caused to move or stop at selected stations. With suitable gear train reduction, the travel of the pilot rack to simulate the entire traverse and programming of a large conveyer can be represented in a convenient length.

By comparing the position or movement of the pilot rack with the position or movement of the full-sized conveyor or other load, a difference or error signal can be devised for automatically controlling the throttle of the drive motor. The device in which the comparison is made is a geared differential. The output of the differential is the "error," which may be a negative or positive direction of rotation of the shaft from a balanced or neutral position thereof. A neutral center servo system connected to the transmission from the drive motor is thus enabled to command forward or reverse motion and at a rate which is dependent upon the amount of the difference or error.

Accordingly, it is an object of this invention to provide a control arrangement for a motor which employs feedback from the drive and the load.

Another object of this invention is to provide a linear programming control for an automatic motor drive system.

Still another object of this invention is to provide a signal controlled motor transmission in which the signal leads the load by an amount proportioned to a control magnitude required for deceleration of the load to stop.

And yet another object of this invention is to provide a control element for a programmed motor driven positioner which functions as a reduced scale model of the positioner load area.

These and other objects and attendant advantages of this invention will become more readily apparent and understood from the following specification and accompanying drawings in which:

FIG. 1 is a schematic diagram of a loader drive cam and operating valves;

FIG. 2 is a cross section of a detail of a control cam and differential;

FIG. 3 is a schematic diagram of the basic elements which control the movement of the loader drive;

Figure 4:
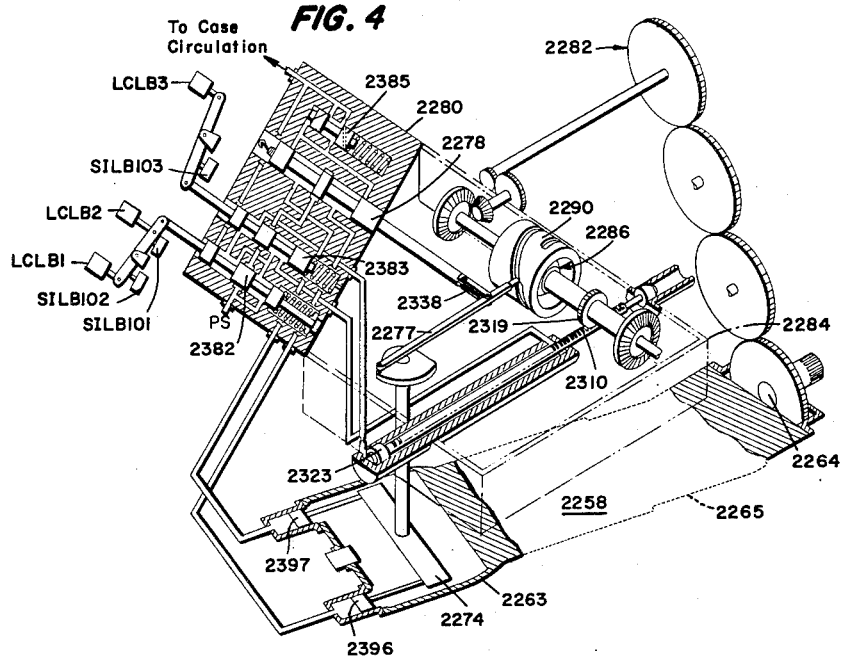
Figure 5:
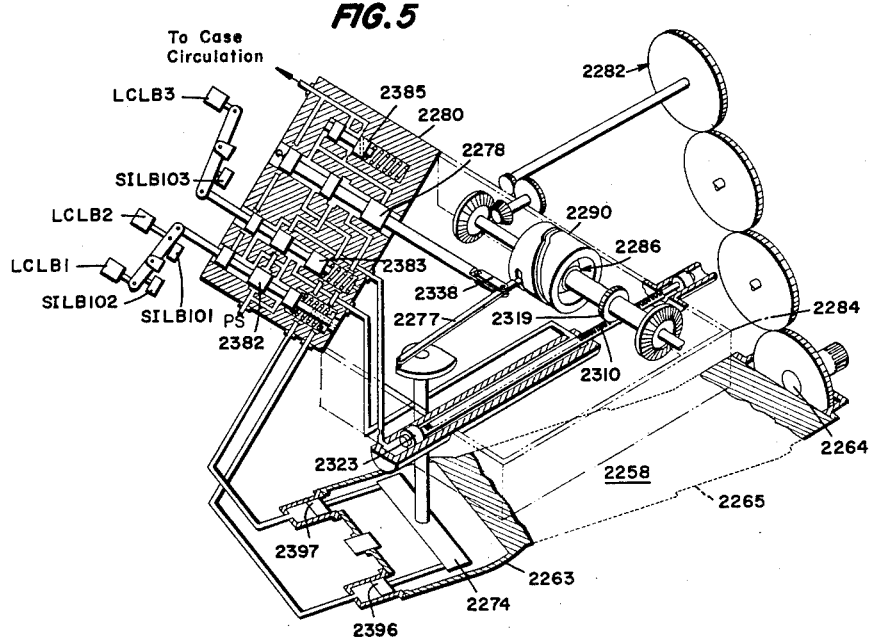
Figure 6:
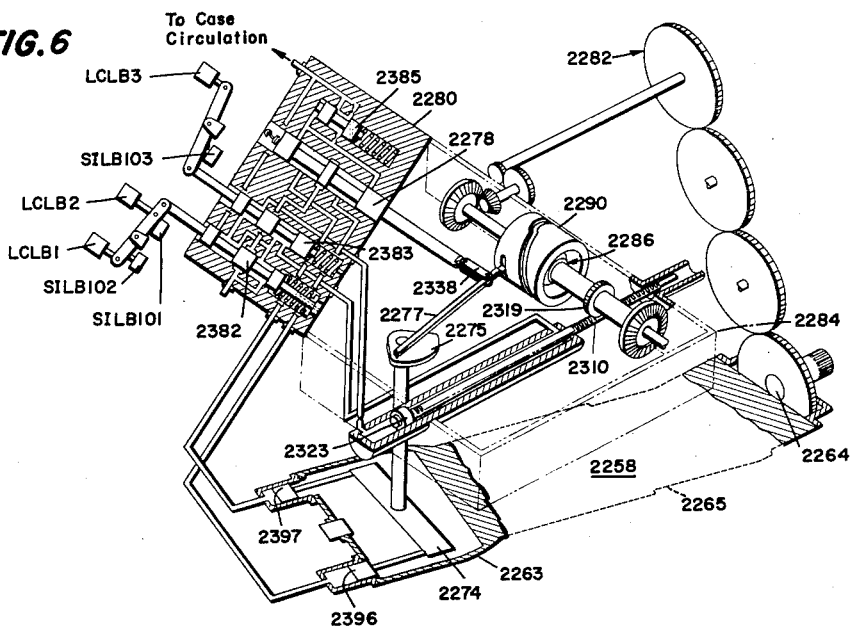
Figure 7:
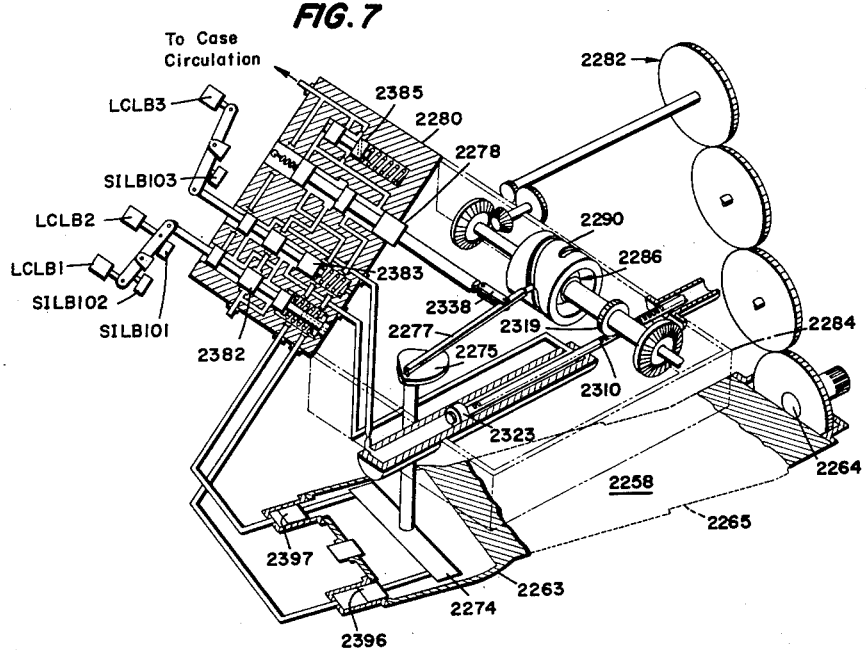
Figure 8:
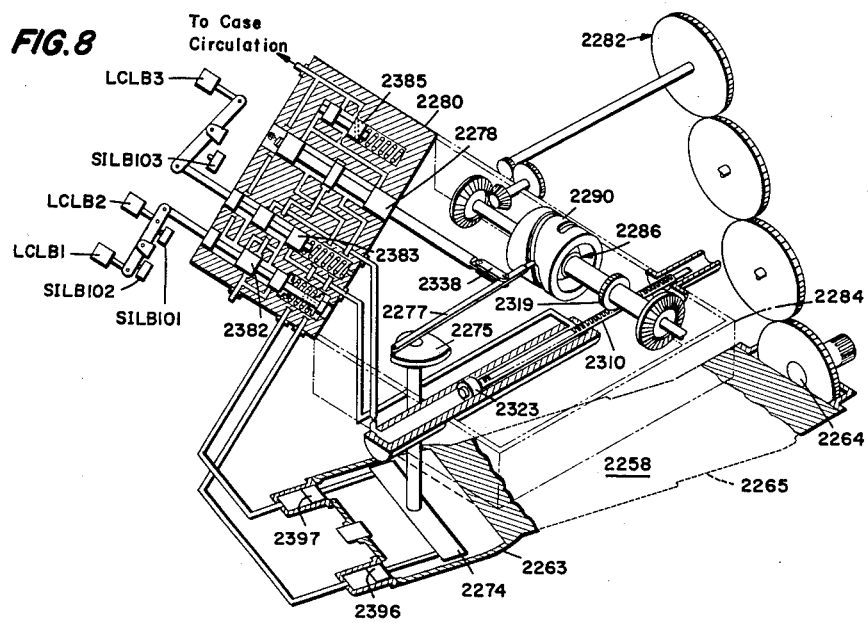
Figure 9:
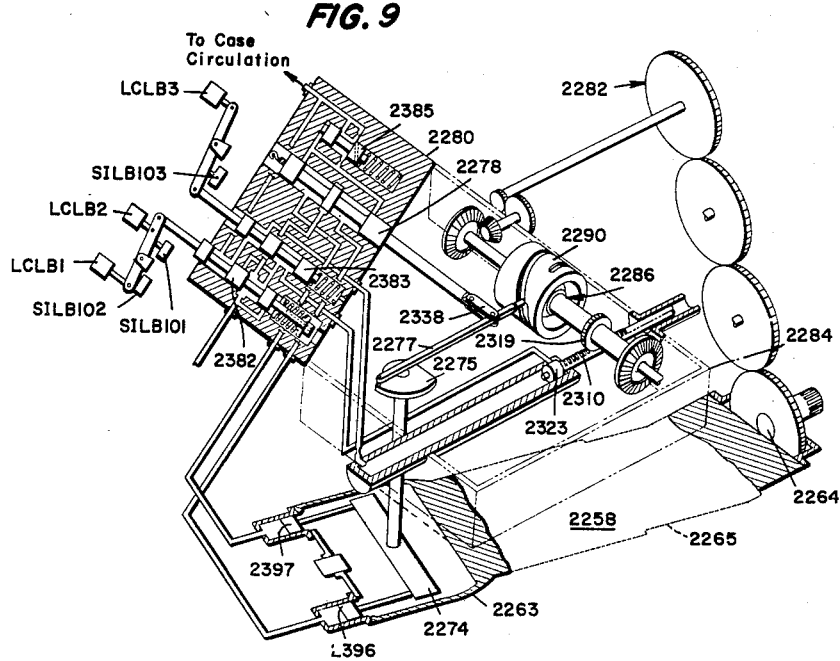
Figure 10A:
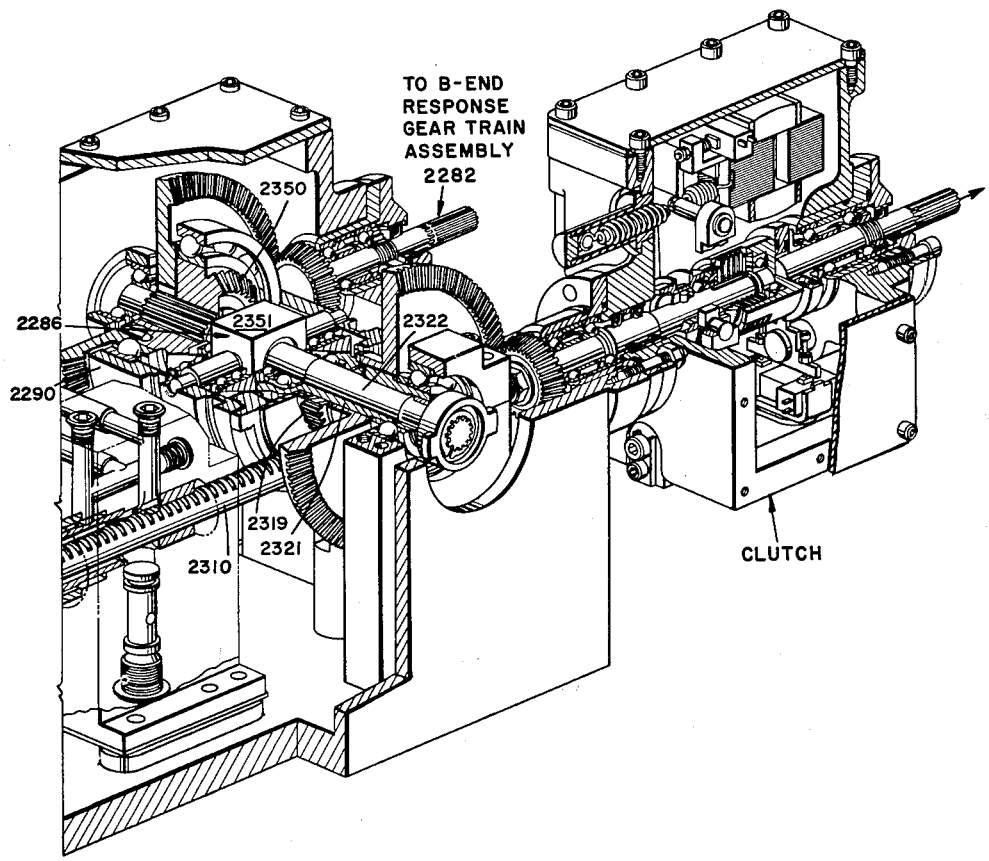

FIG. 4 is an operational schematic of the power drive;
FIG. 5 is an operational schematic of the power drive;
FIG. 6 is an operational schematic of the power drive;
FIG. 7 is an operational schematic of the power drive;
FIG. 8 is an operational schematic of the power drive;
FIG. 9 is an operational schematic of the power drive;
FIG. 10 is a dimetric view, partly cut away, of a pilot rack and differential;
FIG. 10A is a continuation to the right of the dimetric view of FIG. 10, including a handcrank clutch; and
FIG. 11 is a dimetric view of an assembly detail of the guide end of the pilot rack.

In general, a drive or loader chain for a conveyor system for transporting missile weapons is moved along a tramway or loader by a motor driven sprocket.

A conveyor system to which the present invention relates is fully described in a co-pending patent application entitled "Loader Mechanism for Guided Missile Launching System," Serial Number 41,219, filed July 6, 1960, by Myron J. Bauer et al. The motor is connected to the sprocket by a hydraulic transmission which is known as a CAB combination of an A-end and a B-end axial piston pump and motor. As is well-known in the hydraulic art, the transmission is controlled by the movement of a tilt plate therein which can be hydraulically positioned by stroking pistons.

Mechanical feedback from the driven shaft back to the servo valve through a system of levers, gears, a cam and a differential enables a positioning signal to be introduced in the system. The error or difference between the positioning signal and a neutral condition is then automatically reduced to zero by the arrangement during which time the motive force is applied to the drive chain.

Referring now to FIG. 1 of the drawings, there is shown therein a conventional axial piston pump-and motor type of hydraulic transmission 2258. The hydraulic transmission 2258 is provided with an A-end 2263 and a B-end 2265, with an input and output consisting of an A-end shaft 2262 and a B-end shaft 2264. A continuously running motor and a conveyor chain drive sprocket (neither of which are shown) connect to these shafts 2262 and 2264, respectively.

A servo valve 2278 in a valve block 2280 controls the flow of hydraulic fluid under pressure which is limited in flow by a metering valve 2385. A pivoted differential lever 2277 is connected to the servo valve 2278 through a differential lever link 2338. The upper end of differential lever 2277 is provided with a cam follower 2291 which follows a helical groove 2289 on a control barrel cam 2290.

The control barrel cam 2290 contains and is secured to a spider 2351 of a differential 2286, as shown in FIG. 2. A pair of spider gears 2353 on the spider 2351 mesh with an input element or gear 2352 and with a response element or gear 2350. The input element or gear 2352 is symbolically shown in FIG. 2 provided with a crank. The response element or gear 2350 is attached to a gear train or B-end response gearing assembly 2282. This B-end response gearing assembly 2282 is driven by the hydraulic transmission output or B-end shaft 2264 to provide a reversed feedback which is thus introduced into the differential 2286 along with an input signal from the symbolically illustrated crank of FIG. 2.

An input signal (introduced through the crank) rotates the spider 2351 and the barrel cam 2290, of FIGS. 1 and 2. The cam follower 2291 follows the helical groove 2289 and swings the differential lever 2277. The differential lever 2277, in turn, shifts the servo valve 2278 from a neutral position by means of the differential lever link 2338.

Hydraulic pressure fluid is then ported and conducted to one or the other of two stroking pistons 2396 or 2397, shown in FIG. 1, to cause an A-end tilt plate 2274 of A-end 2263 to be canted. The hydraulic transmission 2258 thus is activated, and the motor driven A-end shaft 2262 thereof drives the B-end shaft 2264 to provide motive power for the chain drive system of the tramway or loader (not shown) as long as the symbolic crank is rotated. When the cranking of the crank ceases, the feedback progresses only until the differential 2286 brings the differential lever 2277 and servo valve 2278 to a neutral position. Thereupon, the tilt plate 2274 is centered and power output from the B-end shaft 2264 stops.

As shown in FIG. 1, a shaft 2276 and an arm or response cam 2275 project from the tilt plate 2274. The lower or pivot end of the differential lever 2277 is pivoted on this cam 2275. The differential lever 2277 thus has a moving pivot or A-end response. Any displacement of the upper or differential end of the lever 2277 is thus followed by an equal and opposite displacement of the lower or tilting box end in a continuous action. Motion of the linkage subsides only after the servo valve 2278 returns to its neutral position.

The symbolic crank, which was described and shown in the previous illustrations of FIGS. 1 and 2 as connected to the input element or gear 2352, is replaced in FIG. 3 with a differential shaft 2321. Differential shaft 2321 is provided with a spur gear 2319 which meshes with a long pilot rack 2310. A pilot rack piston 2323 is attached to one end of the pilot rack 2310 and it is located within a pilot rack cylinder 2325.

A spring-centered solenoid controlled loader selector valve 2382 operates the pilot rack piston 2323. If the selector valve 2382 is electrically actuated to the position shown in FIG. 3, pressure fluid is ported to each side of the differential area pilot rack piston 2323 which then extends. Now spur gear 2319 introduces an error signal to the differential 2286 which is analogous to that produced by the previously mentioned symbolic crank.

Fluid flow is purposely restricted to control the rate at which the rack 2310 extends. This rate of signal input is somewhat higher than the previously mentioned metering valve 2385 will allow the transmission to follow and assures that the latter will assume rate acceleration control.

The travel of the pilot rack 2310, which is driven through the differential 2286 from the B-end response gearing assembly 2282, represents an equivalent travel of the previously mentioned conveyor drive chain.

The end of the pilot rack 2310 remote from its pilot rack piston 2323 is provided with a perforated guide 2332, shown best in FIG. 11, which is made to travel within a right pilot rack cylinder 2327, shown in FIGS. 3 and 11, equal in length to the left pilot rack cylinder 2325. If an obstruction, such as a pilot rack stop 2317, is introduced within this right pilot rack cylinder 2327, it too will bring the pilot rack 2310 to a halt, and at a proportional distance of travel, the conveyor drive chain will also halt. The ends of the right pilot rack cylinder 2327 accordingly are the limit of travel of the perforated guide 2332 and this defines the range of movement of the conveyor drive chain.

In the following description of a typical operating cycle, the travel of the loader chain is desired to be interrupted at a location intermediate of its ends. Therefore, the travel of the pilot rack 2310 (which is proportional) is from the left end of its cylinder to a point of contact with an intermediate stop, such as the pilot rack stop 2317 previously mentioned in connection with FIG. 3.

As shown in FIG. 4, a solenoid LCLB1 is first energized to close a switch SILB101, which, in turn, energizes a solenoid LCLB3. The loader selector valve 2382 then shifts to the right, opening to servo fluid pressure (PS) both servo lines to the pilot piston shutoff valve 2383. The pilot piston shut-off valve 2383 then shifts to the right, opening the lines to the pilot rack piston 2323. The pilot rack piston 2323 and the pilot rack 2310 will then move in a rightward direction, as shown in FIG. 5, because of the greater area exposed on the left face of the pilot rack piston 2323.

As the pilot rack 2310 moves to the right, it puts an input signal into the differential 2286. The differential 2286 and the control barrel cam 2290 rotate and move the servo valve 2278 to the left. The servo valve 2278 connects the servo pressure fluid to the stroking piston 2396 and connects the other stroking piston 2397 to case circulation through the servo valve 2278 and the metering valve 2385.

Referring now to FIG. 6, the stroking piston 2396 moves the A-end tilt plate 2274 on stroke which causes the A-end response cam 2275 to move the servo valve 2278 back to neutral. The A-end tilt plate 2274 remains on stroke, and it is held there by equal pressure on both stroking pistons 2396 and 2397. The B-end shaft 2264 rotates the conveyor chain drive sprocket of the loader.

It is to be noted that metering of the discharge of hydraulic fluid from the stroking piston 2397 through the metering valve 2385 determines the rate at which the A-end tilt plate 2274 (urged by the actuating stroking piston 2396) is put on stroke. This, in turn, determines the acceleration rate of the hydraulic transmission 2258 and its load, the conveyer.

The B-end response gearing assembly 2282 feeds back a response to the differential 2286 in a reverse direction to that produced by the movement of the pilot rack 2310. With reference to FIG. 7, the pilot rack 2310 stops, providing no further signal input into the differential 2286. The stopping means is the pilot rack stop 2317 shown in FIG. 3. In case the full travel range is desired, the pilot rack stop 2317 can be withdrawn whereupon the extreme end of the right pilot rack cylinder 2327 becomes the active stop.

In either case, the B-end response gearing assembly 2282 moves the control barrel cam 2290 to neutral. The servo valve 2278 is then shifted to the right to connect servo pressure fluid to the stroking piston 2397 and connect the other stroking piston 2396 to tank through the servo valve 2278 and metering valve 2385.

Referring now to FIG. 8, the stroking piston 2397 moves the A-end tilt plate 2274 back to neutral. The A-end response cam 2275 moves the servo valve 2278 to neutral. When the A-end tilt plate 2274 and the servo valve 2278 are on neutral, the B-end shaft 2264 stops and the loader chain is halted at the desired location and an electrical circuit to solenoid LCLB2 is de-energized.

The loader selector valve 2382 is thereby restored to a neutral position. Switch SILB102 is de-actuated, which then causes the solenoid LCLB3 to de-energize. The pilot rack piston 2323 is neutralized, accordingly, and the system is at rest.

In retracting the loader chain, the operation is similar but in reverse direction of output and rack motion. As shown in FIG. 9, the solenoid LCLB2 is energized. The pilot rack release solenoid LCLB3 is then energized by closing of the switch SILB102, with the pilot piston shutoff valve 2383 being actuated.

The loader selector valve 2382 determines the direction of the pilot rack 2310 and the output rotation of the power drive. With the loader selector valve 2382 in the position in FIG. 9, only one servo fluid line is opened to a pilot piston shutoff valve 2383, with the other line being drained to case circulation.

With the pilot piston shutoff valve 2383 actuated, as shown in FIG. 9, both hydraulic lines to the pilot rack piston 2323 are opened. Because of the position of the loader selector valve 2382, servo pressure fluid is ported only to the rod side of pilot rack piston 2323 and the other side is connected to case circulation through the pilot piston shutoff valve 2383 and the loader selector valve 2382. Therefore, the pilot rack 2310 travels in the reverse direction, as desired. The explanation of the remainer of the reverse cycle is similar to that for the forward cycle and will not be repeated.

While the invention has been described with emphasis on automatic operation, it is obvious that the positioning signal input can be introduced by handcranking or otherwise manually moving the pilot rack 2310. In the present invention, illustrated in FIGS. 10, 10A, and 11, this method is actually employed by clutching in a handcrank. The operator expends only the labor necessary to position the pilot rack 2310 and the system automatically "follows-up" his command.

Obviously, many other modifications and variations of the present invention are possible in light of the above teachings. It is, therefore, to be understood that within the scope of the appended claims the invention may be practiced otherwise than as specifically described.

What is claimed is:

1. A proportional control system for determining the instant position of an object and for initiating the movement of said object to a desired position comprising, a piston rod in the form of a pilot rack rod productive of a first signal representative of the desired position of said object and connected to an adjustable hyrdaulically operated piston for positioning said pilot rack rod, response means for producing a second signal representative of the instant position of said object, means connected between said rack rod and said response means for determining the difference between said first signal and said second signal to produce an error signal, and means controlled by said error signal for initiating the movement of said object to said desired position.

2. A proportional control system for determining the instant position of an object and for initiating the movement of said object to a desired position comprising, a piston rod in the form of a pilot rack rod productive of a first signal representative of the desired position of said object and connected to an adjustable hydraulically operated piston for positioning said pilot rack rod, response means for producing a second signal representative of the instant position of said object, a differential with a cam coupled thereto connected between said rack rod and said response means for determining the difference between said first signal and said second signal to produce an error signal, and means controlled by said error signal for initiating the movement of said object to said desired position.

3. A proportional control system for determining the instant position of an object and for initiating the movement of said object to a desired position comprising, first means for producing a signal representative of the desired position of said object, hydraulic transmission means controllable by a tilt plate and including an output element for driving said object, a differential and cam coupled thereto for initiating movement of said tilt plate, said differential including two inputs, one of said inputs connected to said first signal producing means, second means for producing a signal representative of the instant position of said object mechanically connected between said output element and the second of said differential inputs for controlling the operation of said differential and thereby causing movement of said object from said instant position to said desired position.

4. A proportional control system for determining the instant position of an object and for initiating the movement of said object to a desired position, comprising in combination, a tilt plate controlled power operated hydraulic transmission including an output shaft connected to drive said object, a cam connected to said tilt plate and movable therewith, a differential having first and second inputs and provided with a helical groove on its exterior surface, first mechanical means operably connected between said output shaft and the first of said differential inputs to indicate the position of said object, a piston rod in the form of a pilot rack rod, a hydraulically operated piston for positioning said pilot rack rod to indicate the desired position of said object, second mechanical means connected between said pilot rack rod and the second differential input, a servo valve operably connected to control the movement of said tilt plate, mechanical linkage pivotably connected to said cam and slidably mounted in the groove of said differential, means operably connected betwen said mechanical linkage and said servo valve whereby the positioning of said pilot rack rod to indicate the desired position of said object will, in cooperation with the movement of said cam, actuate said transmission resulting in a power output which will force said object to move until its position corresponds with a desired position as indicated by said pilot rack rod.

References Cited in the file of this patent

UNITED STATES PATENTS

| 2,210,130 | Rose et al. | Aug. 6, 1940 |
| 2,392,889 | Tear | Jan. 15, 1946 |
| 2,403,913 | Ellis | July 16, 1946 |
| 2,526,665 | Hull et al. | Oct. 24, 1950 |
| 2,561,023 | Kane | July 17, 1951 |
| 2,581,149 | Shaw | Jan. 1, 1952 |
| 2,583,656 | Lay | Jan. 29, 1952 |
| 2,601,760 | Swartz et al. | July 1, 1952 |
| 2,654,999 | Berge | Oct. 13, 1953 |
| 2,679,138 | Kane | May 25, 1954 |
| 2,871,660 | McDonald | Feb. 3, 1959 |

FOREIGN PATENTS

| 551,119 | Italy | Nov. 16, 1956 |